April 12, 1960   T. H. KEELER   2,932,095
GAME BOOK
Filed Feb. 25, 1957
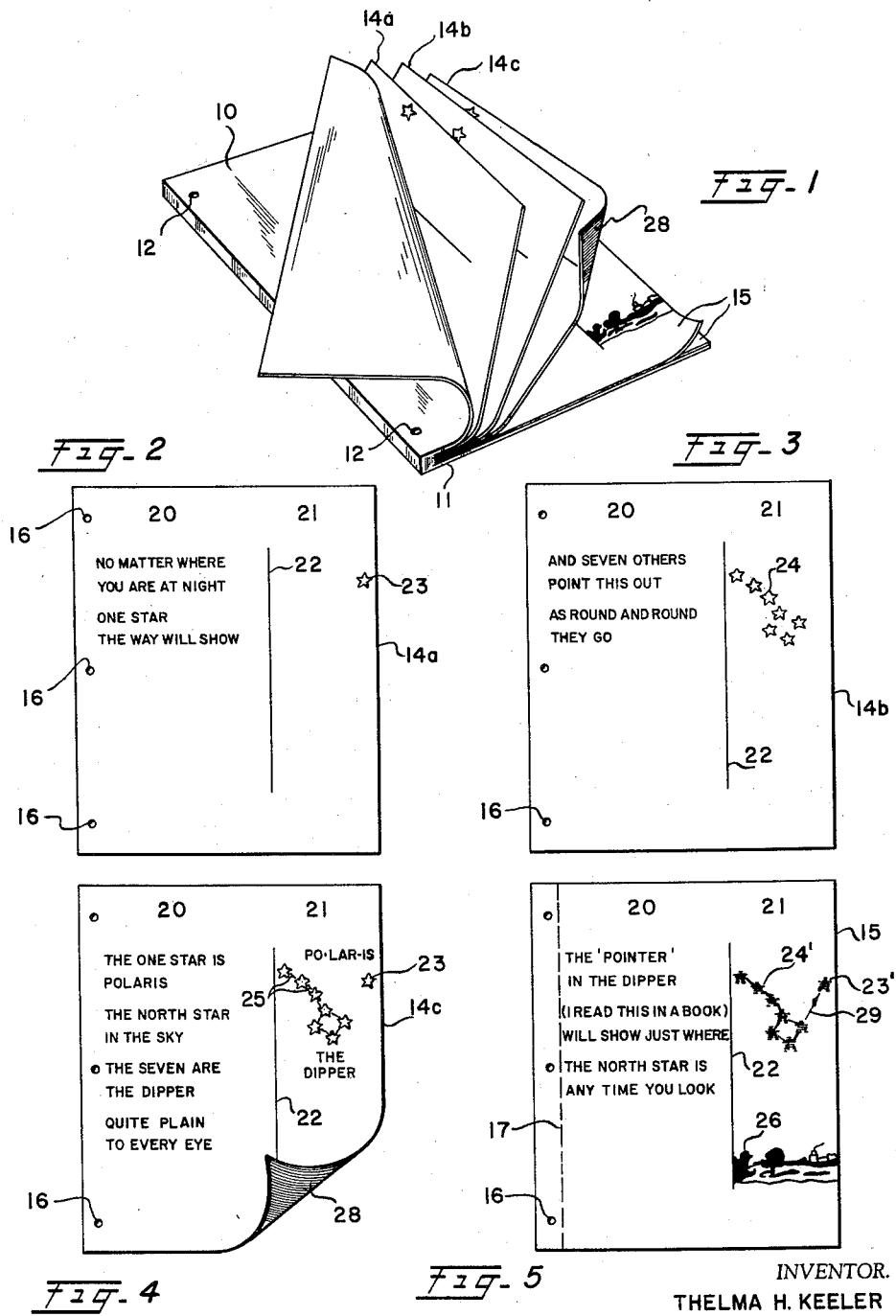
INVENTOR.
THELMA H. KEELER
BY
Attorney

United States Patent Office 2,932,095
Patented Apr. 12, 1960

2,932,095
GAME BOOK
Thelma H. Keeler, Rochester, N.Y.
Application February 25, 1957, Serial No. 642,121
2 Claims. (Cl. 35—26)

This invention relates to books that are designed for both the amusement and education of children. More particularly, the invention relates to a child's book that is intended to afford a pastime while at the same time stimulating a child's interest in the subject matter of the text of the book by inciting the child through tracing to reproduce illustrations that depict that subject matter.

The most common type of such book that is available is one in which a sheet or sheets of thin, transparent tracing paper are detachably bound at the front of a book, and several pages of illustrations are bound in the rear of the book. A child can use a sheet of the tracing paper to reproduce one or more of the illustrations. The tracing paper must be torn from the book in order to use it, and because it is thin, it can be destroyed or mutilated easily, and when this happens, a child can become quite discouraged. Moreover, children often have difficulty in using such paper, because of poor visibility and because of the difficulty involved in tracing along lines that are not directly on the tracing surface. For these reasons, this type of book does not enjoy wide popularity.

One object of the invention is to provide a game book that will maintain a child's interest and that will have educational value as well.

Another object of the invention is to provide a child's tracing book in which the traced pictures are reproduced on a permanent type of paper, so that a child will be encouraged to make careful tracings.

A related object of the invention is to provide a tracing and amusement book for a child that will be easy to use.

Another object of the invention is to provide a child's tracing and amusement book in which the reproduction of a picture is accomplished in successive steps, each of which is easy in itself, so that the child is encouraged to complete the entire reproduction. A related object of the invention is to provide a book of the type just described, in which each step in the reproduction is made interesting by descriptive text material, in verse form, that describes that step.

Another object of the invention is to provide a child's book in which the textual subject matter is presented as a part of a game, so that the child can be exposed to a limited amount of instructive material while being amused.

Still another object of the invention is to provide a game book that is inexpensive and that may be used successively by a plurality of students.

A still further object of the invention is to provide a constructive and instructive game book that can be used by a plurality of children, successively, and that record each child's efforts in permanent form.

Other objects and advantages of the invention will be obvious to those skilled in the art from the following detailed description of a preferred embodiment of the invention that is illustrated in the drawing.

In the illustrated embodiment of the invention, the game book is made up of several sheets, of the same size, that are bound together along one edge. At the front of the book are bound several sheets that contain, respectively, separate parts of an illustration that is to be reproduced; and these sheets are followed by other sheets that are made of permanent-type paper, on which the reproduction of the entire illustration is to be made. A carbon transfer medium is interposed between the last of the former sheets and the first of the latter sheets. The latter sheets can be detached from the book, so that the reproduction can be made several times.

The illustrated sheets at the front of the book are imprinted with successive stanzas of a descriptive jingle. The subject matter of each stanza is illustrated on the same sheet with the stanza.

Each of the latter sheets, on which the reproduction is to be made, is imprinted with the final stanza of the jingle, and as well, with other additional legends, or background illustrations, and the like, that complement the reproduced illustration.

The jingle stanzas and each of the partial illustrations, that are to be reproduced, are designed to stimulate the interest of the child. Interest is further stimulated because the child can trace each partial illustration, to reproduce the entire illustration on the sheet immediately beneath the transfer medium.

Thus, in use of the device, as the child reads each stanza of the jingle, the child can trace over the partial illustration that accompanies that stanza. Tracing can be done with an ordinary lead pencil or other stylus. The tracing is transferred by the transfer element, to the uppermost sheet in the second group. The act of tracing directs the child's attention to the subject matter of the stanza, and the successive tracings are brought together on the uppermost sheet of the second group of sheets to complete the illustration thereon.

The details of this preferred embodiment of the invention may be best understood from consideration of the following description and the accompanying drawing of a preferred embodiment thereof.

In the drawing:

Fig. 1 is a diagrammatic perspective view illustrating a book made according to one embodiment of the invention and opened to the left side, with the sheets opened apart to show the relation thereof;

Figs. 2, 3 and 4, inclusive, show the successive sheets at the front of said book that have partial illustrations, and corresponding stanzas of jingles, thereon; and Fig. 5 shows a sheet from the back of the book, after the illustration thereon has been completed by tracing the outlines thereof from the partial illustrations on the preceding pages.

Referring now in detail to the drawings, the book is provided with a front cover 10, a back cover 11, binding posts 12, a plurality of sheets 14a, 14b, and 14c, forming a first group of sheets, and a plurality of identical sheets 15, forming a second group of sheets.

The several sheets in the book are of the same size, and each sheet is provided with a plurality of apertures 16 to receive the binding posts 12. Each sheet 15 in the second group of sheets is formed with a vertical line of weakness 17 along which the sheet may be detached from the book. Each of the sheets in each group is divided vertically into a jingle or verse portion 20 and an illustration portion 21 by a vertical line 22.

The verse portion 20 of each sheet contains a stanza or verse of a jingle. The stanzas are sequential on the sheets 14a, 14b, and 14c, in the first group of sheets, but the stanza on each sheet 15 in the second group of sheets is identical, and each is a copy of the concluding verse of the jingle. The illustration portion 21 of each sheet in the first group contains a partial illustration in outline form, that illustrates the verse on that page.

Thus, the sheet 14a has an outline of a single star 23 that illustrates the accompanying stanza relating to "one star." The sheet 14b has the outline of seven stars 24, and a stanza describing these seven stars. The sheet 14c has the outline of the seven stars connected by lines 25 generally depicting the shape of a dipper, and the seven stars are identified as "the dipper," while the single star 23 is identified as "Polaris." The accompanying stanza describes all of the stars in an interesting way.

Each sheet 15 in the second group of sheets in the book is identical. Each sheet 15 has an illustration portion 21 that is provided with an appropriate pictorial background scene 26 that complements the illustration of the stars, and with colored areas 23', 24', that coincide with the areas bounded by the outline 23 of Polaris and the outline 24 of the dipper stars, respectively, on the preceding pages. An arrow 29 points to the lone star to depict how the dipper stars can be used to locate Polaris. The text area 20 of each sheet 15 contains the concluding stanza of the jingle.

A hard carbon coating 28 is formed on the undersurface of the final sheet, 14c, of the first group of sheets. The carbon coating 28 has the same width as the illustration portion 21 of all of the sheets in the book and covers the back of the sheet 14c over its entire length.

All of the sheets are bound in the book in such a way that the design outlines 23, 24 for the stars are vertically aligned or registered with the carbon coating 28 and with the colored areas 23', 24', respectively, of each sheet 15 in the second group of sheets in the book. Thus, the star outline 23 on sheet 14a is vertically aligned in the book with the colored area 23' on each of the sheets 15, so that the traced star outline 23 that is transferred to the sheet 15 will coincide with the location of the colored area 23'.

To use the book, it is opened to the left in the normal manner, so that the front cover 10 is turned to expose the sheet 14a. The first stanza is then read, and the outline 23 of the star is traced. The tracing may be done with a pencil or other stylus. The pressure applied to the outline 23 on sheet 14a is transmitted to the carbon coating 28 and causes the transfer of the outline 23 to the sheet 15 immediately underlying the sheet 14c. The sheet 14a is then turned to the left, and the stanza on sheet 14b is read, and the drawing is traced. This transfers the outline 24 of the dipper stars to the sheet 15. In each instance when the outline is transferred by tracing to the sheet 15, the traced star outline encloses a colored area 24' on the sheet 15 and completes the pictorial representation of the dipper stars. After the dipper stars on the sheet 14b have been traced, that sheet is turned to the left to expose the last sheet 14c of the first group. The lines 25 connecting the stars in the dipper are then traced, and the outlines 24 of the dipper stars may or may not be traced again. This transfers the connecting lines to the sheet 15, and completes the design or illustration on that sheet. If the outlines of the stars are retracted on sheet 14c, the carbon tracing of these outlines will be sharper and heavier. Sheet 14c is then turned to the left to expose the completed illustration and final verse on the uppermost sheet 15, together with the background scene 26, or other supplemental or related illustration or legend.

The uppermost sheet 15 may be removed from the book by tearing along the perforated line of weakness 17. This exposes another identical sheet 15 from the second group of sheets in the book, and permits reuse of the book. If a pointed stylus has been used for tracing the design outlines, the book will still have a clean appearance and will be attractive for further use. As many sheets in the second group may be bound in the book as desired, up to the limit of use of the carbon coating 28. The completeness of the illustration of the stars traced through to the sheet 15 is indicative of the care exercised by the child.

It will be readily appreciated that the jingle and accompanying illustrations described above in connection with a specific embodiment of the invention may be replaced, in other books that are made according to the teachings of this invention, with other jingles and other appropriate illustrations. Similarly, different numbers of sheets than those described obviously may be employed. Moreover, more than one reproducible illustration, and its descriptive jingle, can be provided in a single book or binding. For example, in the illustrated example, only a single set of sheets 14 having reproducible partial illustrations is bound with a single set or group of final sheets 15, of permanent-type paper, each of which receives the reproduction. However, several such pairs of groups of sheets can be bound in a single book, and each pair can contain a different illustration for reproduction. Thus, one other illustration for reproduction could be a rabbit. Partial illustrations of the rabbit could include, respectively, the ears, the head and tail, and the body of the rabbit, with the final sheet, that is to receive the reproductions of these parts, having a suitable pastoral scene, descriptive material, or the like. Other suitable subjects to be illustrated in this manner readily suggest themselves. When a plurality of different sets of matter illustrative of different subjects are thus bound together in a single book, a light, plain cardboard backing sheet, similar to cover 11 in Fig. 1, may be used to separate a set of sheets dealing with one subject from the following set of sheets, so that no impression will be made on the second or following set of sheets when tracing the figures on the first or preceding set of sheets.

The use of a carbon coating on a regular sheet in the book is preferred for children's books, over sheet carbon paper, because carbon coatings have the strength of the paper upon which they are coated, and so are less apt to be destroyed during use by young children. Moreover, since the sheet that carries the carbon coating is an integral part of the book, there is less chance that the carbon will be removed than would be the case if a separate sheet of carbon paper were used.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention what I claim is:

1. A play book comprising a plurality of sheets disposed one on top of the other and bound together along one edge in a predetermined sequence so that each sheet turns about that edge to reveal the next succeeding sheet, each said sheet having disposed thereon a partial illustration that is part only of a complete illustration that is to be reproduced, and having thereon a stanza of a jingle that relates to said partial illustration, different of said sheets having different parts of said complete illustration thereon, said different parts being arranged on the several sheets in the same relative positions which they are to occupy in the completed illustration, at least one additional sheet bound in said book to follow said plurality of sheets, said additional sheet turning about said one edge also, said additional sheet having the final stanza of said jingle disposed thereon, and a pressure sensitive transfer element interposed between the final sheet of said plurality of sheets and said additional sheet, whereby said partial illustrations may be transferred successively from each sheet of said plurality of sheets through any sheet of said plurality which lies therebelow and through said pressure sensitive transfer element to said additional sheet in proper relative positions by successive pressure tracing of said partial illustrations, thereby to form a complete illustration on said additional sheet.

2. A book comprising a plurality of sheets disposed one on top of the other and bound together along one edge in a predetermined sequence so that each sheet turns about that edge to reveal the next succeeding sheet, each of said sheets being divided into a text area and an illustration area, said respective areas being aligned on successive sheets in said book, said sheets being arranged in two groups which follow one another, each sheet in a first of said groups having disposed thereon in its illustration area a partial illustration that is a part only of a complete illustration that is to be reproduced, and each sheet in said first group also having disposed thereon in its text area a stanza of a jingle that is descriptive of the partial illustration on that sheet, different of said sheets having different parts of said complete illustration and different stanzas of said jingle thereon, said sheets in said first group being secured together according to the sequence of said text material, said different partial illustrations being arranged on the several sheets of said first group in the same relative positions which they are to occupy in the complete illustration, said second group of sheets being bound in said book after said first group, each sheet in said second group being formed with a line of weakness disposed parallel to the binding so that each sheet of said second group may be detached from said book, each sheet in said second group having disposed thereon in its text area the final stanza of said jingle, and a pressure-sensitive transfer coating disposed on the final sheet in said first group and interposed between said final sheet and the uppermost sheet in said second group, said coating being aligned with said illustration areas, whereby said partial illustrations may be transferred successively from each sheet of said first group of sheets through any sheet of said first group which lies therebelow and through said pressure sensitive transfer coating to the uppermost sheet of said second group in proper relative positions by successive pressure tracing of said partial illustrations, thereby to form a complete illustration on said uppermost sheet of said second group.

References Cited in the file of this patent

UNITED STATES PATENTS

| | | |
|---|---|---|
| 714,806 | Lee | Dec. 2, 1902 |
| 1,206,795 | Barrington | Dec. 5, 1916 |
| 1,583,061 | Loughridge | May 4, 1926 |
| 2,103,943 | Gorton | Dec. 28, 1937 |
| 2,258,603 | Forbell | Oct. 14, 1941 |

FOREIGN PATENTS

| | | |
|---|---|---|
| 349,748 | France | Apr. 11, 1905 |
| 700,347 | Great Britain | Dec. 2, 1953 |